United States Patent
Yamaguchi et al.

(10) Patent No.: US 9,371,098 B2
(45) Date of Patent: Jun. 21, 2016

(54) SPOILER DEVICE FOR VEHICLE

(71) Applicant: AISIN SEIKI KABUSHIKI KAISHA, Kariya-shi, Aichi-ken (JP)

(72) Inventors: Wataru Yamaguchi, Aichi-ken (JP); Yukihide Shibutani, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/795,201

(22) Filed: Jul. 9, 2015

(65) Prior Publication Data

US 2016/0009323 A1    Jan. 14, 2016

(30) Foreign Application Priority Data

Jul. 14, 2014  (JP) .................. 2014-144229

(51) Int. Cl.
*B62D 35/00*    (2006.01)
(52) U.S. Cl.
CPC .................... *B62D 35/007* (2013.01)
(58) Field of Classification Search
CPC ...................................... B62D 35/007
USPC ..................................... 296/180.1
See application file for complete search history.

(56) References Cited

U.S. PATENT DOCUMENTS

| | | | | |
|---|---|---|---|---|
| 3,059,562 A | * | 10/1962 | Sturtevant | B60H 1/248 296/154 |
| 4,881,772 A | * | 11/1989 | Feinberg | B62D 35/007 296/180.1 |
| 5,382,070 A | * | 1/1995 | Turner | B62D 35/007 296/180.1 |

FOREIGN PATENT DOCUMENTS

JP    2013-86571    5/2013

* cited by examiner

*Primary Examiner* — Joseph D Pape
(74) *Attorney, Agent, or Firm* — Finnegan, Henderson, Farabow, Garrett & Dunner, LLP

(57) ABSTRACT

A spoiler device for a vehicle includes a rear spoiler including an airflow controlling surface that is configured to continue to a roof surface and configured to be provided at a roof end, and an air duct including an air inlet opening to the airflow controlling surface and being formed penetrating through the rear spoiler, the air duct including an air outlet positioned in vicinity to an edge portion of the rear spoiler in a vehicle width direction, the air duct configured to guide an airflow at a vehicle top surface to a border portion between a vehicle rear side and a vehicle lateral side.

6 Claims, 3 Drawing Sheets

SPOILER DEVICE FOR VEHICLE

CROSS REFERENCE TO RELATED APPLICATIONS

This application is based on and claims priority under 35 U.S.C. §119 to Japanese Patent Application 2014-144229, filed on Jul. 14, 2014, the entire content of which is incorporated herein by reference.

TECHNICAL FIELD

This disclosure generally relates to a spoiler device for a vehicle.

BACKGROUND DISCUSSION

A spoiler device for a vehicle is known. The known spoiler device for the vehicle includes an airflow control surface, or drag reduction surface that is formed continuously to a roof surface and the known spoiler device is provided at a roof end of the vehicle. Generally, there is a problem that air resistance, or drag of the vehicle increases by the generation of the vortex (trailing vortex) at the rear of the roof end caused by the airflow above a vehicle top surface flowing along the roof surface (upper surface flow). However, according to the known spoiler device (rear spoiler) provided on the vehicle, the generation of the vortex (trailing vortex) at the rear of the roof end can be restrained. Thus, aerodynamic characteristics can be enhanced.

Further, for example, JP2013-86571A (hereinafter referred to as Patent reference 1) discloses a structure in which plural protrusions that receive the wind caused by the running vehicle are provided near a rear windshield that wraps around opposite sides of the vehicle. The trailing vortex is generated, for example, by the airflow having relatively low flowing speed that flows along lateral surfaces of the vehicle at which protrusions, for example, side mirrors and door pillars are provided (lateral flow) is caught, or dragged to the back of the vehicle to be caught, or dragged to under the upper surface flow. According to the construction of Patent reference 1, the lateral flow is likely to be separated from a vehicle body by the protrusions. Thus, by restraining the air from being dragged to the back of the vehicle, the generation of the trailing vortex can be restrained.

Notwithstanding, for example, with a vehicle having a shape in which the incline of a rear surface (rear windshield) is steep because of design, the lateral flow to be caught, or dragged is increased. According to the vehicle constructed as described above, effects of the known device, for example, disclosed in Patent reference 1 is limited, and there remains room for improvement.

A need thus exists for a spoiler device for a vehicle which is not susceptible to the drawback mentioned above.

SUMMARY

In light of the foregoing, the disclosure provides a spoiler device for a vehicle, which includes a rear spoiler including an airflow controlling surface that is configured to continue to a roof surface and configured to be provided at a roof end, and an air duct including an air inlet opening to the airflow controlling surface and being formed penetrating through the rear spoiler. The air duct includes an air outlet positioned in vicinity to an edge portion of the rear spoiler in a vehicle width direction. The air duct is configured to guide an airflow at a vehicle top surface to a border portion between a vehicle rear side and a vehicle lateral side.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
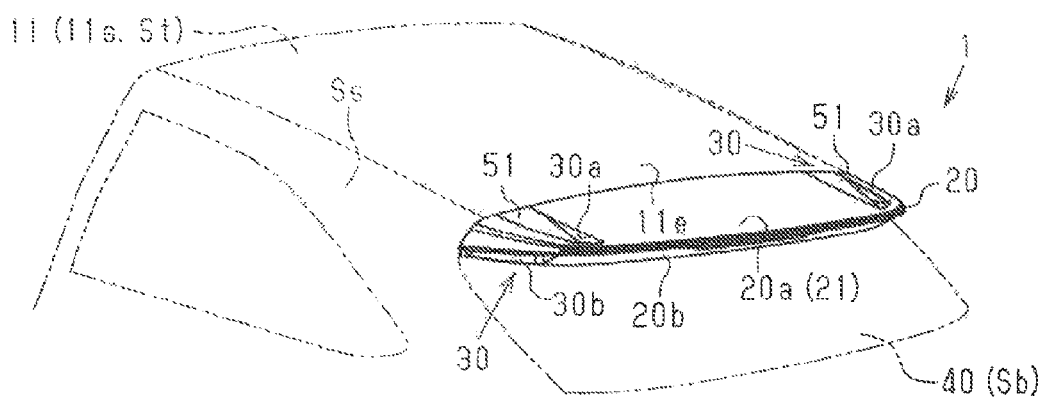
FIG. 1 is a perspective rear view of a spoiler device for a vehicle according to an embodiment disclosed here.

One embodiment of a spoiler device for a vehicle will be explained with reference to illustrations of drawing figures as follows. As illustrated in FIGS. 1-4, a spoiler device 1 for a vehicle according to the embodiment includes a rear spoiler 20 which is provided at a rear end of a roof 11, that is, a roof end 11e. More particularly, the rear spoiler 20 is fixed to the roof end 11e so that a top surface 20a of the rear spoiler 20 serves as an airflow control surface 21 that is formed to continue to a roof surface 11s. That is, the rear spoiler 20 is configured to control the airflow (upper surface flow) that is positioned at a vehicle upper surface St and that flows along the roof surface 11s to a rear of a vehicle. Thus, the spoiler device 1 for the vehicle according to the embodiment is configured to restrain the trailing vortex from generating at the rear of the vehicle and thus to enhance the aerodynamic characteristics.

Further, as illustrated in FIGS. 1 to 7, according to the embodiment, air ducts 30 each including an air inlet 30a that opens to the top surface 20a (serving as the airflow control surface 21) of the rear spoiler 20 is formed inside the rear spoiler 20.

Figure 8:
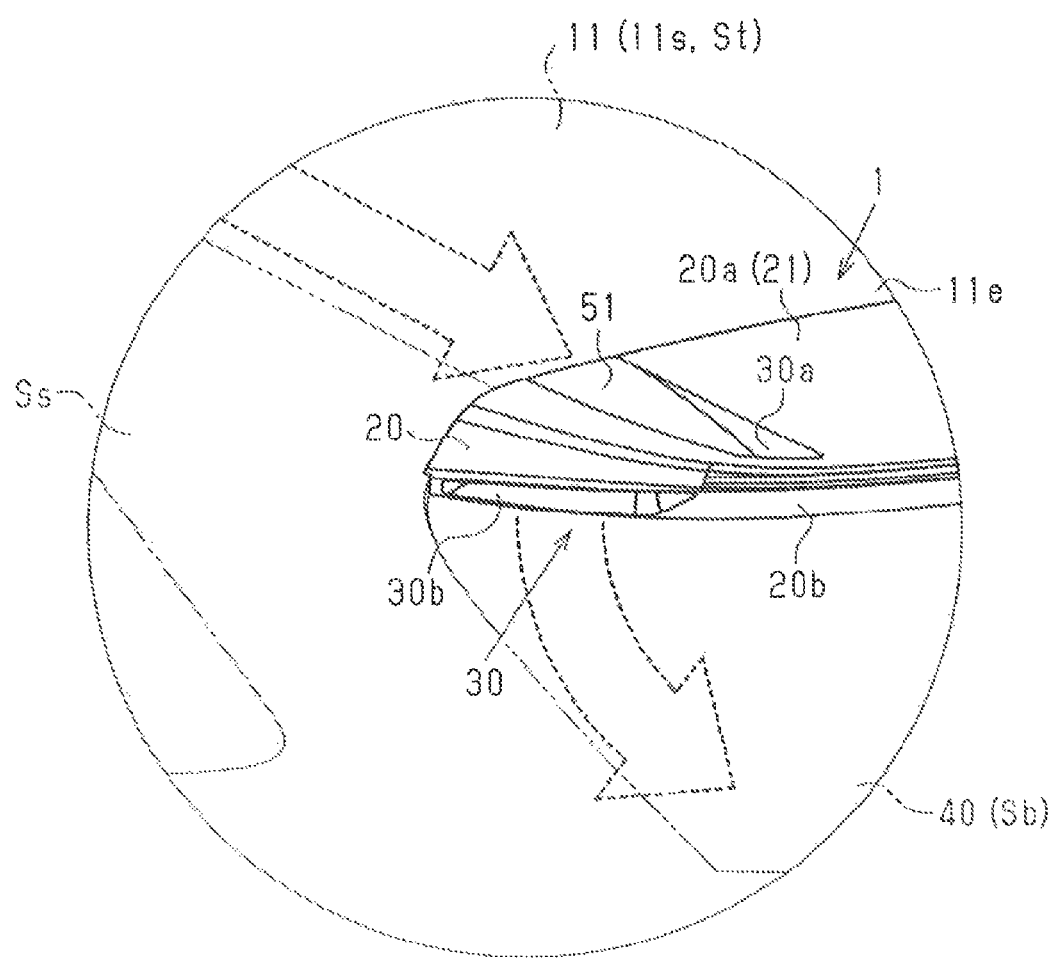
FIG. 8 is an explanatory view for an operation of the spoiler device for he vehicle according to the embodiment disclosed here.

More particularly, the rear spoiler 20 of the embodiment is formed with a pair of air ducts 30, each including the air inlet 30a. The air inlets 30a are disposed at positions close to opposite end portions in a vehicle width direction, at a right-hand side and left-hand side, respectively. Each of the air ducts 30 includes an air outlet 30b that opens to an edge portion of the rear spoiler 20 in the vehicle width direction, or opens in vicinity to an edge portion of the rear spoiler 20 in the vehicle width direction. According to the spoiler device 1 for the vehicle of the embodiment, the air duct 30 is integrally formed with the rear spoiler 20 when resin-molding the rear spoiler 20 in a manner that the air duct 30 penetrates through the rear spoiler 20 from the top surface 20a to a bottom surface 20b. As illustrated in FIG. 8, the spoiler device 1 for the vehicle of the embodiment, thus, allows to introduce, or to guide the airflow flowing at the vehicle upper surface St to a border portion between a vehicle rear side Sb and a vehicle lateral side Ss.

Figure 4:
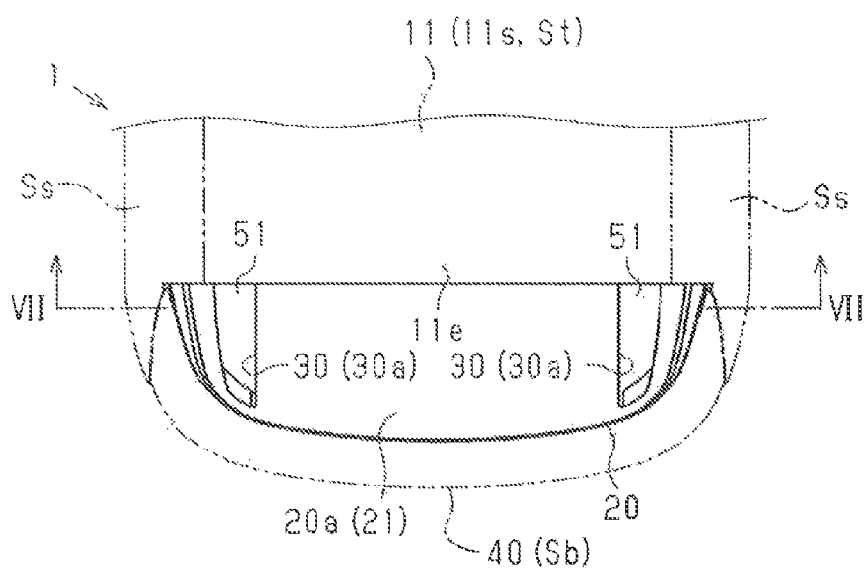
FIG. 4 is a top view of the spoiler device for the vehicle according to the embodiment disclosed here.
Figure 5:
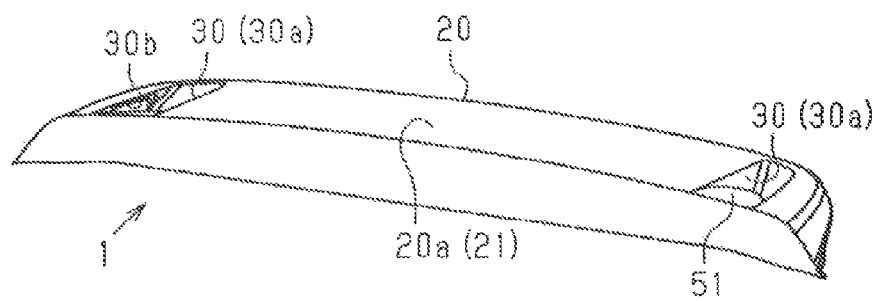
FIG. 5 is a perspective front view of the spoiler device for the vehicle according to the embodiment disclosed here.
Figure 7:
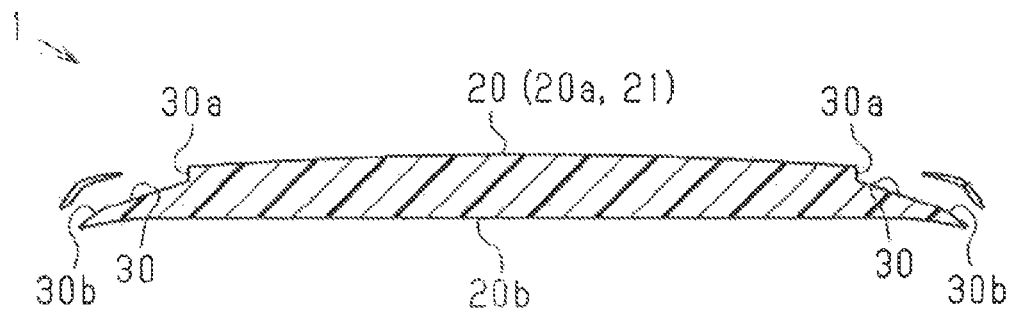
FIG. 7 is a cross-sectional view of the spoiler device for the vehicle taken on line VII-VII in FIG. 4 according to the embodiment disclosed here.

More particularly, as illustrated in FIGS. 1, 4 and 5, according to the embodiment, the air inlet 30a of the air duct 30 includes an incline 51 that moderately declines from a vehicle front side to a rear side (from top to bottom in FIG. 4). As illustrated in FIG. 7, each of the air ducts 30 extends from an inner side to an outer side in the vehicle width direction (right-hand, left-hand direction in FIG. 7) in a manner that the air duct 30 intersects the incline 51.

That is, the upper surface flow that flows to the rear of the vehicle along the roof surface 11s flows into the air duct 30 along the incline 51. The rear spoiler 20 of the embodiment does not include the protrusions that protrude from the airflow control surface 21 at the rear of the air inlet 30a. That is, a portion positioned at the rear of the air inlet 30a of the rear spoiler 20 is structured only with the airflow control surface 21. Further, as illustrated in FIG. 4, the air duct 30 of the embodiment includes a fluid path configuration with which a lower portion of the rear spoiler 20 cannot be seen from the top surface 20a side of the rear spoiler 20. According to the embodiment, the airflow flowing to each of the air ducts 30 is emitted from the air outlets 30b, respectively, positioned at opposite ends in the vehicle width direction.

Figure 2:
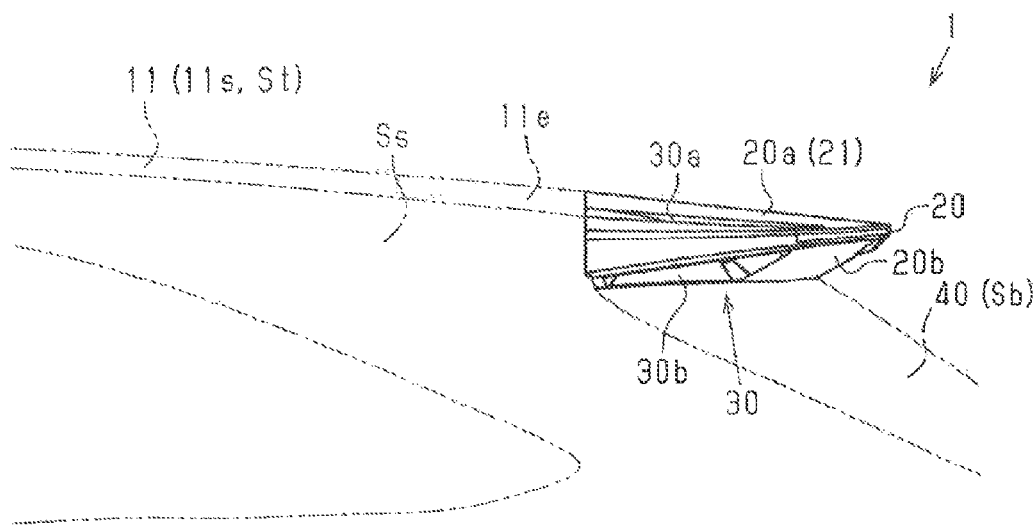
FIG. 2 is a lateral view of the spoiler device for the vehicle according to the embodiment disclosed here.
Figure 3:
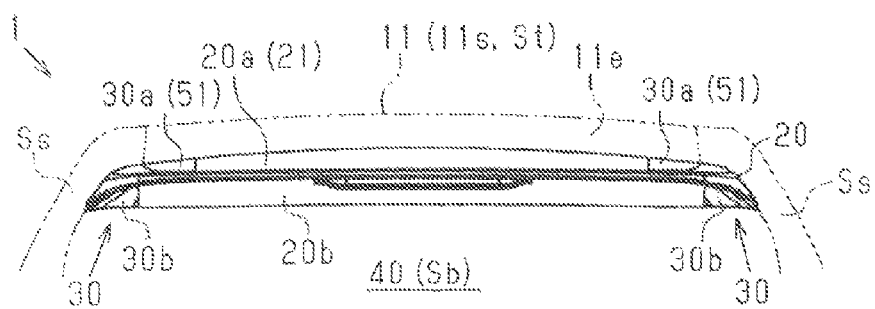
FIG. 3 is a rear view of the spoiler device for the vehicle according to the embodiment disclosed here.
Figure 6:
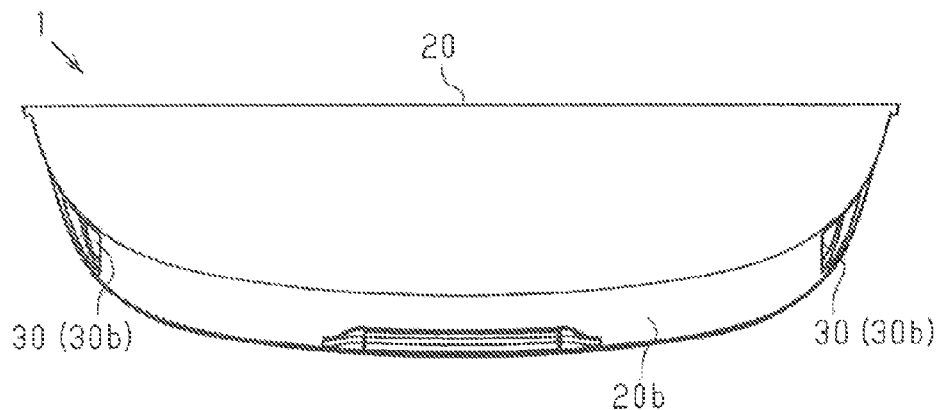
FIG. 6 is a bottom view of the spoiler device for the vehicle according to the embodiment disclosed here.

As illustrated in FIGS. 2, 3 and 6, according to the embodiment, the air outlet 30b of each of the air ducts 30 opens obliquely downward and rearward so that the airflow emitted from the air outlet 30b flows, or blows towards the border portion between the vehicle rear side Sb and the vehicle lateral side Ss. Particularly, the air outlets 30b can be seen when viewing the rear spoiler 30 from the sides (side view; see FIG. 2) and from the rear (rear view; see FIG. 3). Each of the air outlets 30b includes a hole configuration (an opening configuration) which is formed in a substantially wedge shape whose opening dimension is greater as being close to a rear of the vehicle (right-hand side in FIG. 2, lower side in FIG. 3).

That is, by introducing the fast airflow (upper surface flow) that is emitted from each of the air duct 30 (air outlet 30b of the air duct 30) to the border portion between the vehicle rear side Sb and the vehicle lateral side Ss, an air curtain is formed at the border portion. Further, because of the airflow emitted from the air duct 30 flowing to the vehicle rear side Sb, a pressure difference between the vehicle rear side Sb and the vehicle lateral side Ss is reduced. Thus, the spoiler device 1 for the vehicle according to the embodiment enhances the aerodynamic characteristics of the vehicle.

As described above, according to the construction of the embodiment, advantages and effects described below can be attained.

First, by forming the air curtain at the border portion between the vehicle rear side Sb and the vehicle lateral side Ss by means of the air (airflow) emitted from the air duct 30, the phenomenon that the air (airflow; lateral flow) at the vehicle lateral side Ss flows into the vehicle rear side Sb can be restrained (air at the vehicle lateral side Ss is restrained from being dragged or caught). Further, because of the reduction of the air pressure difference between the vehicle rear side Sb and the vehicle lateral side Ss by the air (airflow) emitted from the air duct 30, the lateral flow is further restrained from being dragged or caught. In those circumstances, the advantages of the reduction of the pressure difference is assumed to be more notable with the vehicle that restrains the air (airflow) from flowing to downward, or the underside of the vehicle, for example, because of a front spoiler provided at the vehicle.

Thus, the generation of the trailing vortex at the rear of the vehicle is restrained to enhance the aerodynamic characteristics of the vehicle.

Second, the air duct 30 includes the air outlet 30b that opens to the edge portion of the rear spoiler 20 in the vehicle width direction, The air outlet 30b includes the opening that is configured so that the opening dimension increases as being closer to the rear of the vehicle.

That is, in many cases, an inclination angle is set at the vehicle rear side Sb. Thus, by adopting the foregoing construction, the air outlet 30b that includes greater opening dimension can be formed at the edge portion of the rear spoiler 20 in the vehicle width direction. The spoiler 20 is provided at the roof end 11e. Accordingly, the upper surface flow can be introduced to, or guided to the border portion between the vehicle rear side Sb and the vehicle lateral side Ss efficiently.

Third, the air duct 30 includes the fluid path that is configured so that the lower portion of the rear spoiler 20 cannot be seen from the top surface 20a side of the rear spoiler 20. Adopting this construction, the upper surface flow that flows into the air duct 30 from the front side of the vehicle can be introduced to the border portion between the vehicle rear side Sb and the vehicle lateral side Ss that is positioned at an outer side in the vehicle width direction efficiently without allowing the upper surface flow that flows into the air duct 30 from the vehicle front side to flow out under the rear spoiler 20. Further, high design properties can be ensured.

Fourth, the rear spoiler 20 does not include protrusions that protrude from the airflow controlling surface 21 at the rear of the air inlet 30a. Accordingly, the upper surface flow can be introduced to flow in the air duct 30 efficiently. Then, the reduction of the speed of the airflow due to the air passing through the air duct 30 can be restrained, and the upper surface flow can be introduced to the border portion between the vehicle rear side Sb and the vehicle lateral side Ss efficiently.

The embodiment may be modified as described below.

According to the embodiment, the air ducts 30 serving as a pair provided at right-hand side and left-hand side, respectively, and each having the air inlet 30a are formed at the positions close to the opposite ends of the rear spoiler 20 in the vehicle width direction, respectively. Notwithstanding, the structure of the air duct 30 may be changed as desired. For example, the air duct 30 may include the air inlet 30a at a middle portion of the rear spoiler 20 in the vehicle width direction and may be branched within the rear spoiler 20 so as to guide the airflow to the air outlets 30b disposed at the opposite ends in the vehicle width direction, respectively.

Further, the configuration of the openings of the air inlet 30a and the air outlet 30b may be changed as desired. Further, the construction of the fluid path with which the lower portion of the rear spoiler 20 can be seen from the top surface 20a of the rear spoiler 20 may be adopted. Still further, the construction in which protrusions which protrude from the airflow controlling surface 21 are provided at the rear of the air inlet 30a may be adopted.

Further, the fluid path of the air duct 30 may be set so that the airflow that passes through the air duct 30 is assumed to be a spiral flow. That is, by adopting this construction, more reinforced (stronger, more robust) air curtain can be formed at the border portion between the vehicle rear side Sb and the vehicle lateral side Ss. Thus, the phenomenon that the air (airflow; lateral flow) at the vehicle lateral side Ss flows into the vehicle rear side Sb can be restrained (air at the vehicle lateral side Ss is restrained from being dragged or caught). The spiral flow may be formed by known constructions, for example, by forming rise and fall, or unevenness in the air duct 30 or by forming the fluid path in a spiral shape.

According to the embodiment, the spoiler device for the vehicle includes the air duct having a fluid path configuration with which the air (airflow) passing through the air duct is assumed to be a spiral flow.

According to the embodiment, a spoiler device (1) for a vehicle includes a rear spoiler (20) including an airflow controlling surface (21) that is configured to continue to a roof surface and configured to be provided at a roof end (11e), and an air duct (30) including an air inlet (30a) opening to the airflow controlling surface (21) and being formed penetrating through the rear spoiler (20), the air duct (30) including an air outlet (30b) positioned in vicinity to an edge portion of the rear spoiler (20) in a vehicle width direction, the air duct (30) configured to guide an airflow at a vehicle top surface to a border portion between a vehicle rear side (Sb) and a vehicle lateral side (Ss).

By introducing the fast airflow that flows at the vehicle top surface side (upper surface flow) and that is emitted from the air duct (30) to the border portion between the vehicle rear side (Sb) and the vehicle lateral side (Ss), an air curtain is formed at the border portion. According to this construction, the phenomenon that the airflow (lateral flow) at the vehicle lateral side (Ss) flows into the vehicle rear side (Sb) can be restrained (air at the vehicle lateral side is restrained from being dragged or caught). Further, the air pressure difference between the vehicle rear side (Sb) and the vehicle lateral side (Ss) is declined because of the airflow emitted from the air duct (30) flowing to the vehicle rear side (Sb). Accordingly, the lateral flow is further restrained from being dragged or caught. In consequence, the generation of the trailing vortex at the rear of the vehicle is restrained to enhance the aerodynamic characteristics of the vehicle more effectively.

According to the embodiment, the air outlet (30b) is provided at the edge portion of the rear spoiler (20) in the vehicle width direction and includes an opening having a configuration in which a dimension of the opening increases as being close to a rear of the vehicle.

That is, in many cases, an inclination angle is set at the vehicle rear side. According to this construction, the air outlet (30b) that includes greater opening dimension can be formed at the edge portion of the rear spoiler (20) in the vehicle width direction, the rear spoiler (20) being provided at the roof end 11e). Thus, the upper surface flow can be guided to the border portion between the vehicle rear side (Sb) and the vehicle lateral side (Ss) efficiently.

According to the embodiment, the air duct (30) includes a fluid path having a configuration with which a lower portion of the rear spoiler cannot be seen from a top surface side of the rear spoiler (20).

According to the foregoing construction, the upper surface flow that flows into the air duct (30) from the vehicle front side can be efficiently guided to the border portion between the vehicle rear side (Sb) and the vehicle lateral side (Ss) positioned at an outer portion in the vehicle width direction without allowing the upper surface flow to flow out under the rear spoiler (20). Further, high design properties can be attained.

According to the embodiment, a portion positioned at a rear of the air inlet (30a) of the rear spoiler (20) is structured only with the airflow controlling portion (21).

According to the foregoing construction, the upper surface flow can be introduced in to the air duct (30) efficient. Thus, the reduction of the airflow speed because of passing through the air duct (30) is restrained and the upper surface flow can be guided to the border portion between the vehicle rear side (Sb) and the vehicle lateral side (Ss) efficiently.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A spoiler device for a vehicle, comprising:
   a rear spoiler including an airflow controlling surface that is configured to extend from a roof surface of the vehicle and configured to be provided at an end of a roof of the vehicle; and
   an air duct including an air inlet opening in the airflow controlling surface, the air duct passing through the rear spoiler, and including an air outlet positioned in an outer portion of the rear spoiler along a width direction of the vehicle, the air duct being configured to guide an airflow at a vehicle top surface to a border portion between a vehicle rear side and a vehicle lateral side;
   wherein a vehicle top surface of the rear spoiler is flush with the roof surface of the vehicle.

2. The spoiler device for the vehicle according to claim 1, wherein the air outlet is provided at an outer edge of the rear spoiler along the width direction of the vehicle and includes an opening having a configuration in which a dimension of the opening close to a rear of the vehicle is larger than a dimension of the opening further away from the rear of the vehicle.

3. The spoiler device for the vehicle according to claim 1, wherein the air duct includes a fluid path having a configuration such that when viewing the vehicle top surface of the rear spoiler, a lower portion of the rear spoiler cannot be seen.

4. The spoiler device for the vehicle according to claim 1, wherein a portion of the rear spoiler positioned at a rear of the air inlet defines only an airflow controlling surface.

5. The spoiler device for the vehicle according to claim 1, wherein the air duct comprises a first air duct and a second air duct disposed only at respective opposite end portions of the rear spoiler along the width direction of the vehicle.

6. The spoiler device for the vehicle according to claim 1, wherein the air inlet is sloped such that the air inlet declines from a front side of the vehicle to a rear side of the vehicle, and the air duct extends from an inner side to an outer side along the width direction of the vehicle.

\* \* \* \* \*